United States Patent Office 3,519,483
Patented July 7, 1970

3,519,483
SEPARATOR FOR ALKALINE ELECTRIC BATTERIES AND METHOD OF MAKING
Helmuth Louis Pfluger and Howard Eugene Hoyt, Huntingdon Valley, Pa., assignors to Borden, Inc., New York, N.Y., a corporation of New Jersey
No Drawing. Filed Nov. 2, 1967, Ser. No. 679,987
Int. Cl. H01m 35/00, 3/00
U.S. Cl. 136—6                                12 Claims

ABSTRACT OF THE DISCLOSURE

This invention relates to battery separator membranes of high electrolytic conductivity comprising a cellulose ether and a compatible metallic salt of water soluble aliphatic acids and their hydroxy derivatives.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The cycle life of rechargeable battery cells is known to be limited by the tendency of the electrodes to short circuit and this tendency can be slowed down by the use of a separator membrane between the electrodes. In the particular case of alkaline silver-zinc cells, such a separator must withstand both the oxidizing power of silver oxide and the penetration of metallic zinc and must also have low resistance to the passage of an electrolytic current.

Films of cellulose ethers, particularly methyl cellulose, have excellent withstanding powers against both silver oxidation and zinc metal penetration. In spite of these advantages, the use of such cellulose ethers by themselves has not been successful because their resistance to passage of an electrolytic current is prohibitively high in the 30 to 45% potassium hydroxide solutions customarily required in battery cells. While ways of physical modification of methyl cellulose membranes in the wet state have been discovered by the present inventors, as covered in pending applications Ser. No. 658,999 filed Aug. 8, 1967 and Ser. No. 680,048 filed Nov. 2, 1967, it is desirable in some applications that the dry membrane should be capable of developing high conductivity by simple equilibration with the cell electrolyte. In prior art, such as shown in U.S. Pat. 2,858,353 (Mendelsohn) this has been achieved by incorporation within methyl cellulose films of certain highly polar, more conductive polymeric material. However, films modified in this manner are not as flexible in the dry state as unmodified methyl cellulose films and require special control of humidity in order to insure freedom from damage during handling.

SUMMARY OF THE INVENTION

We have now found that methyl cellulose can be modified by another class of materials, non-polymeric in nature, to form battery separator membranes of low electrolytic resistance but which have the flexibility of membranes made of unmodified methyl cellulose; and which in many cases enhances flexibility over membranes made with unmodified methyl cellulose.

Briefly stated, our invention is directed to separator membranes for electrochemical cells comprising a cellulose ether and a modified selected from the group consisting of metallic salts of water-soluble aliphatic acids and their hydroxy derivatives, and to electrochemical cells utilizing said membranes.

DETAILED DESCRIPTION

This invention may be applied to any membrane made of a water-soluble or water-swellable and alkali insoluble cellulose ether, such as methyl cellulose, ethly cellulose, propyl cellulose.

Preferred material is methyl cellulose, particularly methyl cellulose in which 1.6 to 1.9 out of every 3.0 available hydroxyl units of cellulose have been etherified. Methods for etherifying cellulose to different degrees and using a variety of ether groups are known to the art and are not a subject of this patent application.

The additive may be any water-soluble salt formable by the reaction between a hydroxide of a metal of Group I and Group II of the Periodic Table and an acid selected from the group consisting of monobasic aliphatic acids with from one to four carbon atoms, dibasic aliphatic acids with from two to five carbon atoms, and tribasic aliphatic acids with from four to six carbon atoms. The acid may have one, two or three carboxy groups and may be hydroxylated. Thus, for example, the acid may be formic, acetic, propionic, butyric, isobutyric, succinic, glutaric, fumaric, maleic citric, tartaric, glycolic or lactic acid. The cation of the salt may be sodium, potassium, lithium, calcium, strontium, ammonium or substituted ammonium, as for example tetramethyl amonium. Preferred are the acids of lower equivalent weight, less than 2–3 C's per carboxy group, and, specifically, potassium lactate and potassium acetate.

The amount of salt may vary from 3% to 40% by weight with respect to the cellulose ether in the formulation. Preferred amounts are in the range of 20 to 35% by weight, the choice being determined by the degree of resistance-lowering desired and by the necessity of avoiding frosting out of the salt from the film which occurs at varying threshold levels depending upon the salt used.

In addition to the cellulose ether, the polymeric composition of the film may also include minor amounts of more polar polymeric materials such as polyacrylic acid or the 1:1 copolymer of vinyl methyl ether and maleic anhydride. The polar polymeric substance may vary in concentration up to 30% by weight, but it is generally preferred not to exceed 10% because of the stiffening and non-flexibilizing effects which such components impart.

The membrane may be prepared by combining aqueous solutions respectively of methyl cellulose and of the other additives. The resulting composition may be cast in sheet form and evaporated to dryness. Other forms may be made as for example plates, slabs, "buttons," films and the like. Variations in the procedure include the use of aqueous solutions of the salts or adding alkali to the aqueous solution of the corresponding acids either before or after admixing with the methyl cellulose solution. Solutions of the components should not be so concentrated as to precipitate the components before drying.

Good flexibility in the film is of particular importance in the construction of the individual battery cells during the operation of wrapping the separators around the electrodes. In one common technique a so-called U wrap is made whereby two positive electrodes are placed butt end to butt end on a sheet of separator and after, for example, six wraps of the pair the wrapped assembly is folded at the junction in the form of the letter U. When separators of poorer flexibility are used cracks tend to occur in the separator at the base of the U, particularly in the outer wraps, thus destroying the utility of the separator at these points. We have found experimentally that this is particularly likely to occur below a certain critical threshold of flexibility, corresponding to withstanding at least about 800 flex cycles as measured by the ASTM Folding Endurance Test D643–43 with 200 grams tension on the specimen.

The invention will be further illustrated by description in connection with the following specific examples of the practice of it; the proportions here and elsewhere herein are expressed as parts by weight unless specifically stated to the contrary.

EXAMPLE 1

200 grams of a 10% solution of methyl cellulose (Methocel 15) in water and 20.0 grams of a 14.3% solution of potassium lactate in water were completely mixed at 5° C. Films were cast on levelled glass plates by use of the drawdown procedure, using a 23 mil clearance on the doctor blade. A clear homogeneous, one-phase film of 1.4 mil thickness was obtained. The flexibility of the film was evaluated in terms of the MIT flex test, using the ASTM Specifications D643–43 for Folding Endurance, with 200 g. tension. Another portion of the film was equilibrated with 45% potassium hydroxide solution and its electrolytic resistance measured in an appropriate conductivity cell.

The same tests were made on a 1.5 mil straight methyl cellulose film. These tests showed that the potassium lactate addition had resulted in a lowering in electrolytic resistance from 6080 to 295 milliohms-in.$^2$. The flex resistance had simultaneously been improved from 3798 cycles to 5672 cycles.

EXAMPLE 2

The procedure of Example 1 was used with 4.10 parts potassium lactate to 95.9 parts methyl cellulose. The film had 1.4 mil thickness, MIT flex of 5024 cycles and electrolytic resistance in 45% KOH of 2225 milliohms-in.$^2$.

EXAMPLE 3

The procedure of Example 1 was used with 7.80 parts potassium lactate to 92.2 parts methyl cellulose. The film had 1.5 mils thickness, MIT flex of 4172 cycles and 875 milliohms-in.$^2$ resistance in 45% KOH.

EXAMPLE 4

The procedure of Example 1 was used with 27.2 parts potassium lactate to 77.8 parts methyl cellulose. The film had 1.6 mil thickness, MIT flex of 5840 cycles and electrolytic resistance of only 170 milliohms-in.$^2$ in 45% KOH.

EXAMPLE 5

A film was cast using the procedure of Example 1 from a solution containing 70 parts methyl cellulose and 30 parts of the 1:1 copolymer of vinyl methyl ether and maleic anhydride. The film was 1.6 mils thick, had an electrolytic resistance of 376 milliohms-in.$^2$ in 45% potassium hydroxide. However, its flexibility was so low that it withstood only 518 cycles under the MIT Flex Test. The film, under the designation "C3" has shown promising performance in several cycling tests in commercial-type cells at Crane Ammunition Depot and elsewhere, but its low flexibility makes special handling necessary to insure freedom from mechanical damage during assembly of cells.

EXAMPLE 6

The procedure of Example 1 was used with 8.9 parts of potassium acetate to 91.1 parts methyl cellulose. The film had 1.6 mil thickness, MIT flex of 4731 cycles and electrolytic resistance in 45% KOH of 399 milliohms-in.$^2$.

Thus by this method a film is obtained which has an electrolytic resistance comparable with the product of Example 5, but also has the advantage of high flexibility which makes it easier to handle during cell assembly.

EXAMPLE 7

The procedure of Example 1 was used with 24.6 parts of potassium acetate to 75.4 parts methyl celluose. The film had 1.6 mil thickness, MIT flex of 7311 cycles and electrolytic resistance in 45% potassium hydroxide of 34 milliohms-in.$^2$.

EXAMPLE 8

The procedure of Example 1 was used with 14.9 parts potassium acetate to 85.1 parts of methyl cellulose. The film had 1.6 mil thickness, MIT flex of 5987 and electrolytic resistance of 137 milliohms-in.$^2$ in 45% potassium hydroxide.

EXAMPLE 9

The procedure of Example 1 was used with 15.2 parts potassium propionate on 100 parts methyl cellulose. The film had 1.8 mil thickness, MIT flex of 5015 cycles and electrolytic resistance in 45% potassium hydroxide of 145 milliohms-in.$^2$.

EXAMPLE 10

The procedure of Example 1 was used with 14.3 parts potassium butyrate on 100 parts methyl cellulose. The film had 1.4 mil thickness, MIT flex of 5154 cycles, and electrolytic resistance in 45% potassium hydroxide of 226 milliohms-in.$^2$.

EXAMPLE 11

The procedure of Example 1 was used with 28.6 parts potassium butyrate on 100 parts of methyl cellulose. The film had 1.4 mil thickness, MIT flex of 7591 cycles and electrolytic resistance in 45% potassium hydroxide of 110 milliohms-in.$^2$.

EXAMPLE 12

The procedure of Example 1 was used with 90 parts methyl cellulose, 10 parts of the 1:1 copolymer of polyvinyl methyl ether and maleic anhydride and 28 parts potassium lactate. The film had 1.7 mil thickness, MIT flex of 7926 cycles and electrolytic resistance in 45% potassium hydroxide of 69 milliohms-in.$^2$.

EXAMPLE 13

Representative films of cellophane an dfilms of this invention were stirred for 72 hours in 30% potassium hydroxide saturated with silver oxide. At the end of this period the saturated films were broken in a tensile testing machine. As controls, representative samples of the same films were stirred for 72 hours in 30% potassium hydroxide in the absence of silver oxide and likewise broken in a tensile testing machine. The stability of the films to the silver oxide was measured in terms of the ratio of the strength of the oxidized film to that of the film exposed to potassium hydroxide only.

The stability ratio was found to be well above 80% for the films of this invention whereas cellophane had zero strength after the exposure to alkaline silver oxide. For example, a film composed of 77.8 parts methyl cellulose and 22.2 parts potassium lactate had a stability factor of 83%; and a film composed of 75.4 parts methyl cellulose and 24.6 parts potassium acetate had a stability factor of 88%. Thus the films of this invention are superior to the customarily used cellophane in withstanding the oxidation power of silver oxide which is a normal constituent of the electrolyte in silver-zinc, silver-cadmium battery cells, and other silver cells.

It will be understood that it is intended to cover all changes and modifications of the examples of the invention herein chosen for the purpose of illustration which do not constitute departures from the spirit and scope of the invention.

What is claimed is:

1. A battery separator membrane for alkaline electrochemical cells comprising a cellulose ether and a conductance-modifying salt selected from the group consisting of water-soluble metal salts of aliphatic acids and their hydroxy derivatives, said salt being present in a proportion greater than about 3% by weight of the cellulose ether, but below that proportion at which it will frost out from the membrane.

2. The membrane of claim 1 wherein the cellulose ether is methyl cellulose and the salt is a potassium salt of a monobasic aliphatic acid having from 1 to 4 carbon atoms.

3. The membrane of claim 2 wherein the ether is methyl cellulose with a degree of substitution in the range of 1.6 to 1.9 and the salt is potassium acetate in a proportion of from about 3% to about 40% by weight of the methyl cellulose.

4. The membrane of claim 2 wherein the ether is methyl cellulose with a degree of substitution in the range of 1.6 to 1.9 and the salt is potassium lactate in a proportion of from about 3% to about 40% by weight of the methyl cellulose.

5. An alkaline electrochemical cell comprising electrodes, a concentrated aqueous alkali fluid, and the battery separator of claim 1 interposed between the electrodes.

6. An alkaline silver cell comprising electrodes, a concentrated aqueous alkali fluid, and the battery separator of claim 1 interposed between the electrodes.

7. An alkaline silver-zinc cell comprising a silver electrode, a zinc electrode, a concentrated aqueous alkali fluid, and the battery separator of claim 3 interposed between the electrodes.

8. An alkaline silver-zinc cell comprising a silver electrode, a zinc electrode, a concentrated aqueous alkali fluid, and the battery separator of claim 4 interposed between the electrodes.

9. A battery separator membrane for alkaline electrochemical cells comprising methyl cellulose with a degree of substitution in the range of 1.6 to 1.9 and a conductance-modifier dispersed therein selected from the group consisting of potassium acetate and potassium lactate, said modifier being present in a proportion of from about 3% to about 40% by weight of the methyl cellulose.

10. An alkaline silver-zinc cell comprising a silver electrode, a zinc electrode, a concentrated alkali fluid and, interposed between the electrodes, a separator membrane comprising methyl cellulose with a degree of substitution in the range of 1.6 to 1.9 and a conductance-modifier dispersed therein selected from the group consisting of potassium acetate and potassium lactate, said modifier being present in a proportion of from about 3% to about 40% by weight of the methyl cellulose.

11. An alkaline electrochemical cell comprising electrodes, a concentrated aqueous alkali fluid and a battery separator comprising methyl cellulose with a degree of substitution in the range of 1.6 to 1.9 and a conductance-modifier dispersed therein selected from the group consisting of potassium acetate and potassium lactate, said modifier being present in a proportion of about 3% to about 40% by weight of the methyl cellulose.

12. A method for increasing the electrolytic conductance which a methyl cellulose membrane develops after being swollen in concentrated aqueous alkali; which method comprises
(a) making an aqueous solution comprising methyl cellulose and a salt selected from the group consisting of water-soluble metal salts of aliphatic acids and their hydroxy derivatives,
(b) casting said solution in sheet form, and
(c) evaporating said sheet to dryness,
said salt being present in a proportion greater than about 3% by weight of the cellulose ether, but below that proportion at which it will frost out from the membrane.

References Cited

UNITED STATES PATENTS

| | | | |
|---|---|---|---|
| 2,534,336 | 12/1950 | Cahoon. | |
| 2,858,353 | 10/1958 | Mendelsohn | 136—146 |
| 2,900,433 | 8/1959 | Cahoon et al. | 136—146 |
| 3,013,099 | 12/1961 | Mendelsohn | 136—146 |
| 3,347,689 | 10/1967 | Futami et al. | 106—178 |

WINSTON A. DOUGLAS, Primary Examiner

D. L. WALTON, Assistant Examiner

U.S. Cl. X.R.

106—178; 136—146; 260—232